July 7, 1953
H. R. POHLE
2,644,691
ROLLER DEVICE FOR MOVING LOADS
Filed April 24, 1951
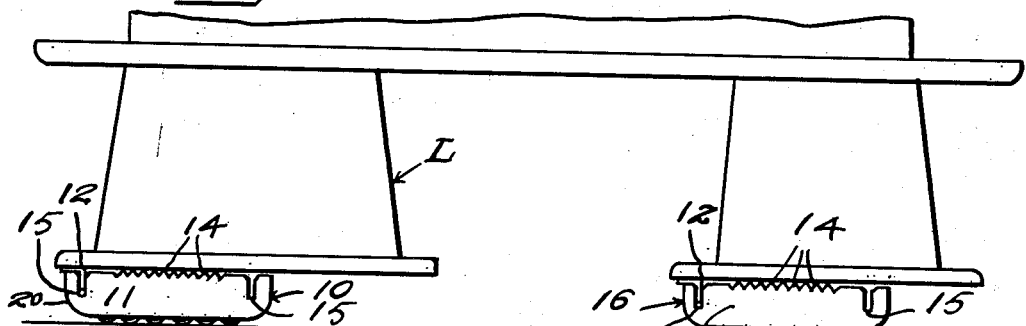
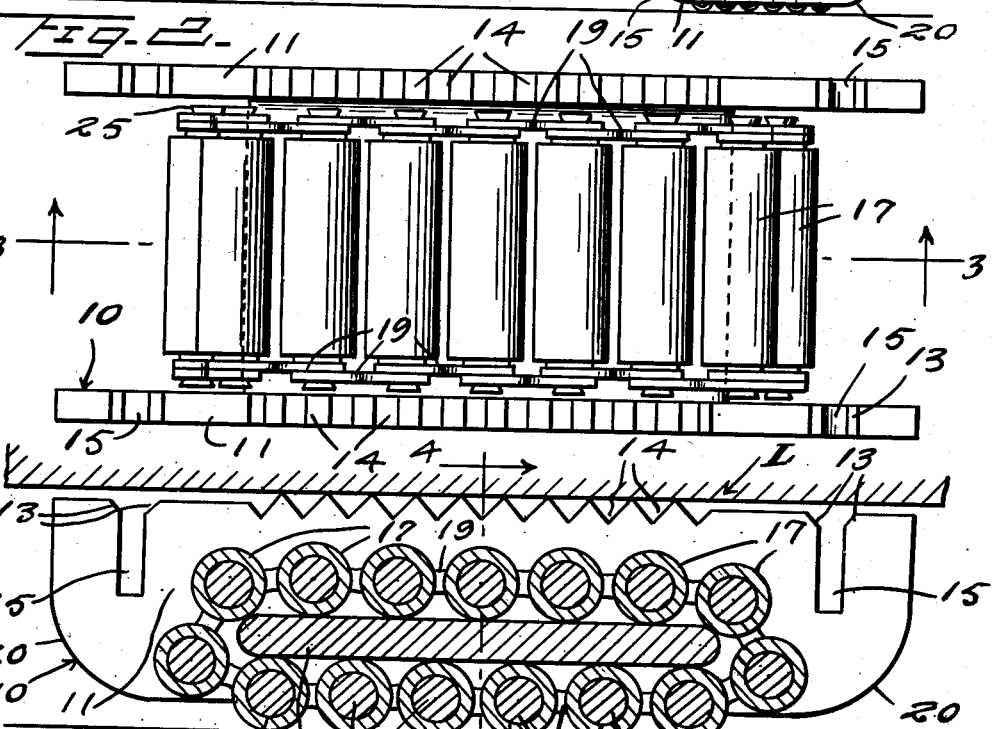
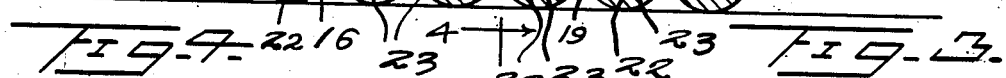
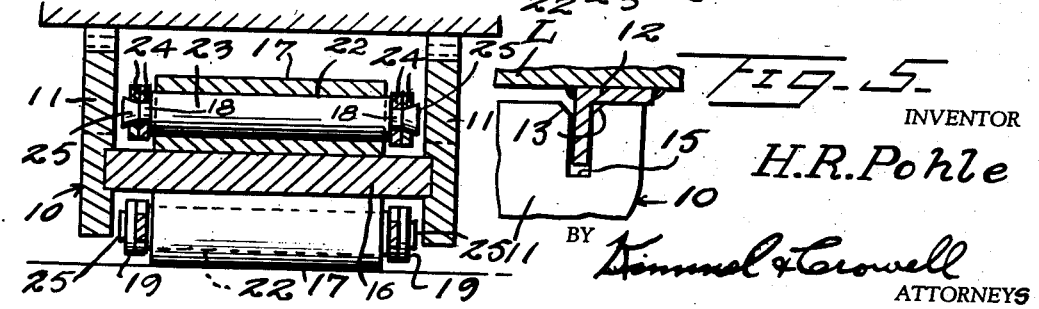
INVENTOR
H. R. Pohle
BY
Kimmel & Crowell
ATTORNEYS Patented July 7, 1953

2,644,691

UNITED STATES PATENT OFFICE 2,644,691

ROLLER DEVICE FOR MOVING LOADS

Herman R. Pohle, New York, N. Y.

Application April 24, 1951, Serial No. 222,618

1 Claim. (Cl. 280—1)

This invention relates to a roller device, and more particularly to a roller device for facilitating the movement of machines, cases, or other loads or objects from one place to another.

An object of the invention is to provide a roller device which is adapted to be positioned beneath an object to be moved, such as a machine or case loaded with goods, or an article of furniture, whereby the object can be readily moved to a desired location, the device of the present invention including a plurality of spaced parallel rollers which are adapted to engage a floor or other surface to thereby minimize frictional resistance to movement of the object.

Another object of the invention is to provide a roller device which will enable heavy loads to be moved with ease, safety, and with a great saving of labor and time, the load to be moved being adapted to be supported by one or more of the roller devices of the present invention.

Still another object of the invention is to provide a roller device which will eliminate the necessity of permanently affixing rollers to the undersurface of a load, the roller device being constructed so that a positive sliding motion of the load can be accomplished, even over irregular floor surfaces.

A still further object of the invention is to provide a roller device or carriage for use in moving loads from one place to another, the roller device of the present invention being constructed so that the weight or pressure of the load is taken by a rolling action through the medium of an endless roller track, the roller device of the present invention being small in size but ruggedly constructed so that a heavy load can be supported thereby.

A further object of the invention is to provide a roller device which is extremely simple and inexpensive to manufacture.

Other objects and advantages will be apparent during the course of the following description.

In the accompanying drawing, forming part of this application, and in which like numerals are used to designate like parts throughout the same, Fig. 1 is a side elevational view showing a load movably supported by a plurality of the roller devices of the present invention;

Fig. 2 is a top plan view of the roller device of the present invention;

Fig. 3 is a sectional view taken on the line 3—3 of Fig. 2;

Fig. 4 is a sectional view taken on the line 4—4 of Fig. 3; and

Fig. 5 is an enlarged fragmentary sectional view showing the angle iron seated in one of the slots.

Referring in detail to the drawing, the numeral 10 designates the roller device of the present invention. The roller device may be fabricated of any suitable material, such as metal, and the roller device 10 includes a pair of bars 11 which are arranged in spaced parallel relation with respect to each other.

Each of the bars 11 has the same formation, and each bar 11 includes a plurality of spaced pointed teeth 14 which are arranged along the upper surface of the bar 11. It will be seen from the drawing, that the upper pointed ends of the teeth 14 extend above the upper surface of the bars 11 so that these teeth can engage the lower surface of an object to be moved, such as a lathe, crate, or other device.

Arranged contiguous to each end of the bars 11 is a slot or cutout 15. It is to be noted that the slots 15 in one of the bars 11 are arranged in alignment with the slots 15 in the other bar 11. These slots 15 are adapted to receive therein a portion of an angle iron 12 which may be secured to the undersurface of the object to be shifted or moved. Thus, the angle iron 12 by being seated in the slots 15 will insure that the roller devices 10 do not accidentally slip out of place from beneath the object being moved. The upper portion of each of the slots 15 is enlarged or flared outwardly as at 13 to facilitate the seating of the angle iron 12 in the slots.

Extending between the pair of bars 11 and secured thereto is a plate 16 which has its ends rounded, Fig. 3. The plate 16 is arranged at right angles with respect to the bars 11. Interposed between the pair of bars 11 and extending around the plate 16 is an endless roller track which comprises a plurality of spaced parallel rollers or journals 17 which have a cylindrical shape. Each of the rollers 17 is hollow or is provided with a longitudinally extending bore 22. A shaft 23 rotatably extends through each of the bores 22, and a trunnion or pin 18 of reduced diameter projects from each end of the shaft 23. Links 19 extend between the trunnions 18, and the links 19 are each provided with openings 24 which rotatably or pivotally receive therein the trunnions 18. The outer ends of the trunnions 18 are flattened or provided with an enlarged head 25 so that the links 19 will be maintained in their proper place on the trunnions 18. It is to be noted that the shafts 23 are slightly longer than the rollers 17 so that the links will be maintained out of contact with the rollers 17, whereby there will be no interference with movement of these parts. Thus, during movement of the machine, crate or other object, the rollers 17 will engage the floor, ground, or other surface, to facilitate movement of the load. It is to be noted that the rollers 17, links 19, shafts 23, and trunnions 18 constitute an endless track for engaging the ground or floor.

The ends of each of the bars 11, adjacent the lower surface thereof, are shaped arcuately or are rounded, as indicated by the numeral 20, so that the movement of the load will not be interfered with by irregular surfaces or protruding articles.

As shown in Fig. 1 of the drawing, a plurality of the roller devices 10 may be used for supporting a load, such as a lathe, the load being indicated by the letter L and a portion thereof being shown in the drawing.

From the foregoing, it is apparent that a roller device has been provided which will eliminate the necessity of affixing rollers permanently to the undersurface of furniture, machinery or other objects to be moved. The roller devices are especially suitable for use in factories, or other buildings, and the endless track will support the load by a rolling action. It is to be noted that the rollers 17 extend below the lower surface of the bars 11, Figs. 1, 3 and 4, so that when these rollers are in their lowermost position, they will engage the floor, ground or other surface.

By means of the roller devices of the present invention, frictional resistance will be decreased, and heavy loads can be moved with ease and safety, and also a great saving of labor and time will be effected. Further, positive sliding motion of the load will be insured even over irregular floor surfaces, and there will be no risk of accidents, the roller devices being sturdily constructed and inexpensive and simple to manufacture.

The roller devices can be used either under the corners of a load or the roller devices can be spaced in any desired position. Further, if desired, an entire load may be partially supported on one of the roller devices. Also, the size of the roller devices can be varied, as desired.

When the roller devices of the present invention are being used, one or more of the carriages or devices of the present invention are merely pushed into position beneath the object to be moved and, if necessary, the carriages 10 can be interconnected by means of the angle iron 12 which can extend into the slots 15, the angle iron 12 adapted to be secured to the bottom of the load, as by welding. When the carriages are moving in a straight line or path, it is not necessary to adjust the position of the carriages, and when movement along a curved path is desired, the carriages can be readily displaced with a minimum of effort. Further, once a slight effort has been made to set the load into motion, the initial momentum will allow the load to be moved with a minimum of effort. The carriages of the present invention can be utilized to move machines, or machine components, cases, furniture, or can be used in forwarding businesses and for loading trucks.

It is to be further noted that the rollers 17, when in their lowermost position, extend below the bottom of the bars 11 so that the rollers engage the floor, ground, or other surface. Thus, the entire weight or pressure of the load will be exerted through the lowermost rollers and onto the plate 16. This will result in the entire load pressure being taken by the plate 16 by a rolling action through the medium of the endless roller track.

What is claimed is:

A roller device including a pair of bars arranged in spaced parallel relation with respect to each other, there being aligned slots arranged in said bars for receiving an angle iron adapted to be attached to the bottom of a load to be moved, the upper portion of said slots being flared outwardly, a plate extending between said bars and secured thereto, an endless roller track trained over said plate and interposed between said bars, said track comprising a plurality of cylindrical rollers arranged in spaced parallel relation with respect to each other, there being a longitudinally extending bore extending through each of said rollers, a shaft rotatably positioned in each of said bores, a trunnion projecting from each end of said shaft, and links extending between said trunnions and pivotally connected thereto, portions of said rollers extending below said bars when the rollers are in their lowermost position, whereby the rollers engage a surface to cause the load pressure to be exerted against said plate.

HERMAN R. POHLE.

References Cited in the file of this patent

UNITED STATES PATENTS

| Number | Name | Date |
|---|---|---|
| 224,741 | Stith | Feb. 17, 1880 |
| 788,930 | Morgan | May 2, 1905 |
| 2,301,341 | Stevens et al. | Nov. 10, 1942 |
| 2,383,754 | Watt | Aug. 28, 1945 |
| 2,550,219 | Bollinger | Apr. 24, 1951 |

FOREIGN PATENTS

| Number | Country | Date |
|---|---|---|
| 3,536 | Great Britain | Feb. 6, 1812 |
| 32,510 | Switzerland | Dec. 2, 1904 |